(No Model.)  5 Sheets—Sheet 1.

A. G. DAVIS.
REGULATING ELECTRIC MOTORS.

No. 587,937.  Patented Aug. 10, 1897.

Fig. 1

Witnesses  
Inventor  
Albert G. Davis.

(No Model.)  A. G. DAVIS.  5 Sheets—Sheet 2.
REGULATING ELECTRIC MOTORS.

No. 587,937.  Patented Aug. 10, 1897.

WITNESSES:
Jesse D. Newton
J. H. Jochum Jr

INVENTOR
Albert G. Davis (No Model.) 5 Sheets—Sheet 4.

A. G. DAVIS.
REGULATING ELECTRIC MOTORS.

No. 587,937. Patented Aug. 10, 1897.

WITNESSES:
Jesse D. Newton
J. W. Jochum Jr

INVENTOR
Albert G. Davis.

UNITED STATES PATENT OFFICE.

ALBERT GOULD DAVIS, OF WASHINGTON, DISTRICT OF COLUMBIA.

REGULATING ELECTRIC MOTORS.

SPECIFICATION forming part of Letters Patent No. 587,937, dated August 10, 1897.

Application filed November 17, 1896. Serial No. 612,493. (No model.)

*To all whom it may concern:*

Be it known that I, ALBERT GOULD DAVIS, a citizen of the United States, residing at Washington, in the District of Columbia, have invented certain new and useful Improvements in Regulating Electric Motors, &c., (Case No. 5,) of which the following is a specification, taken in connection with the drawings hereto annexed.

My invention relates to the regulation of alternating-current motors, systems, &c., and has for its object to overcome certain difficulties which have presented themselves in the operation of such motors in commercial work.

One of the present systems of alternating-motor regulation is that known as the "tandem multiple," in which the motors are started in tandem and run in multiple. By "tandem" in this connection is meant that arrangement in which the secondary member of one motor feeds the primary of the next. The objection to such an arrangement is that it imports a large self-induction into the secondary circuit of the first motor and tends to destroy the torque. This I prevent by placing suitable condensers in the circuit in such a way that they set up waves of electromotive force which tend to correct in each secondary the lag due to the self-induction, which self-induction is principally due in practice to the primary winding of the next succeeding motor. I prefer to so adjust the condensers that the circuits are resonant for each particular speed desired, which tends greatly to increase the torque, but do not limit myself to a resonance condition, as it is in some cases sufficient if the self-induction be only partially neutralized. It is evident that I may replace the condensers in this arrangement by any other devices which will perform the same function, as electrolytic cells or other phase-advancing devices, but my invention also comprises the use of an overexcited field-magnet winding on one of the motors to get up the required leading electromotive force and replace the condensers.

Another serious objection to the ordinary tandem-multiple systems is that the same coils are obliged to act as secondaries and also as generating-coils to furnish the current for the next succeeding motor. If they are given the low resistance usual in such members, the primaries of the next succeeding motors must also be given low resistance, and the current flowing becomes enormous. As this current has to pass through long connections and often through rubbing contacts, the $C^2R$ loss outside the motors becomes large and the efficiency of the combination low, while the varying resistance of the rubbing contacts is with such heavy currents fatal to good regulation and even torque. If, on the other hand, the resistance is made high to overcome this defect, the motors must run with low efficiency when they are connected in multiple.

My invention therefore contemplates reducing the resistance of the secondary windings in the multiple condition, and while this may be accomplished in various ways I prefer to provide on each secondary member two windings, one of high resistance to act as a generating-winding and one of low resistance to act as a short-circuited secondary. In this way I avoid the troubles mentioned above and also obtain an advantage at the time of passing from one connection to the other, as by closing the heavy winding of the first motor I am able to practically cut off all of the current from the other motors and avoid the necessity of shunting on the usual resistance. To facilitate the closing of the heavy circuit and to avoid the necessity of bringing its current to the controller, I provide a magnetically-operated switch on the induced member, controlled in any desired way, as by the main controller, as more fully described hereinafter. I may use several such switches on each induced member to cut out resistance gradually, and to simplify the operation I may use an interconnected two-phase winding on the secondary and place the resistance or resistances in the common return.

My invention also comprises a new method of reducing the spark on opening the secondary circuit of a translating device, which consists in closing a tertiary circuit, preferably of very low resistance, in inductive relation to the secondary circuit, whereby the lines of force cutting the secondary circuit, and therefore the current flowing therein, are very much reduced, and subsequently opening the secondary circuit.

It will be seen that many of these improvements are not confined to tandem-motor systems, but are of more general application.

In the drawings attached to this specification.

Figure 1:
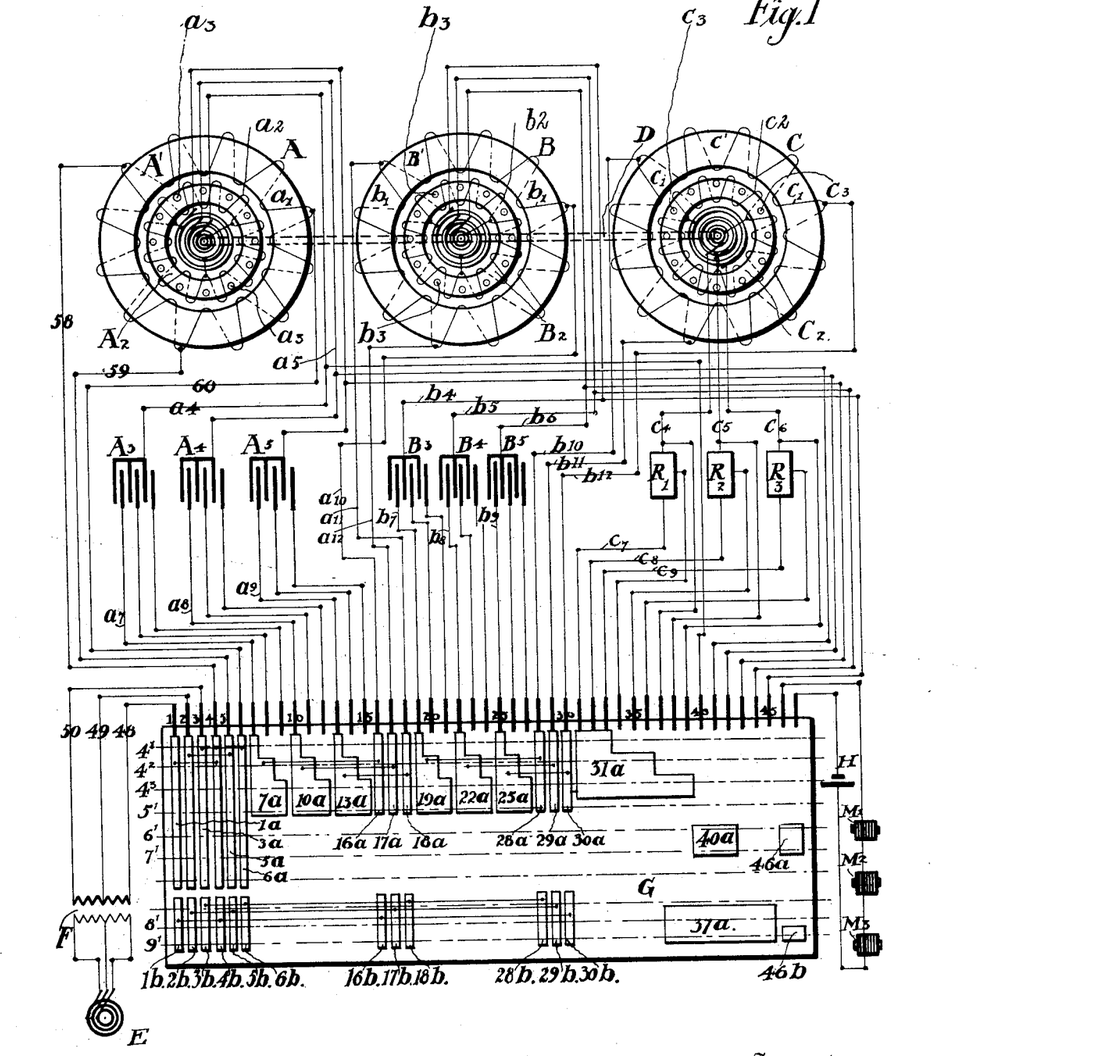
Figure 1 is a diagram showing three motors and their controller, with condensers, arranged according to my invention.

In Fig. 1, A, B, and C are the motors, geared in such a way that they may revolve together, as by being mounted to drive the same load. I have indicated this mechanical connection by the dotted lines D. A', B', and C' are the inducing members, respectively, wound in any preferred way with the usual primary windings $a'$, $b'$, and $c'$. $A^2$, $B^2$, and $C^2$ are the induced members, wound with windings $a^2$, $b^2$, and $c^2$. I have shown three-phase ring-windings for convenience of illustration, but may use any number of phases and any type of windings whatever, though if single-phase is used some of the usual starting arrangements are necessary. In addition the induced members carry the windings $a^3$, $b^3$, and $c^3$, respectively, which are similar to those usual in the secondaries of induction-motors.

A generator E furnishes current which passes into the system through a transformer or transformers F, if desired, and to the controller G. This controller may be in its mechanical construction similar to the ordinary series-parallel controller and is shown only in diagram. Condensers $A^3$, $A^4$, $A^5$, $B^3$, $B^4$, and $B^5$, of suitable capacity, are provided.

The brushes of the controllers are numbered from 1 to 47, consecutively. Wires 48, 49, and 50 lead from the generator to the brushes 1, 2, and 3. Contacts, as shown, are provided on the controller, and dotted lines 4' 5' 9' show the six different positions of the controller corresponding, respectively, to the diagrams Figs. 4 to 9, inclusive.

$R'$, $R^2$, and $R^3$ are resistances.

H is a source of current, preferably direct, and $M'$, $M^2$, and $M^3$ are magnets controlling the heavy windings $a^3$, $b^3$, and $c^3$, respectively, as will now be described.

Figure 2:
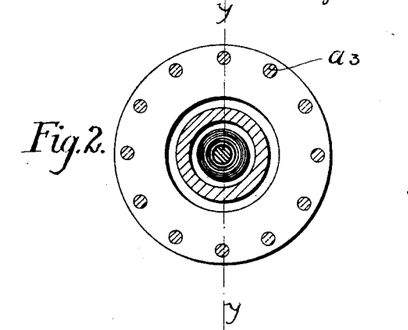
Fig. 2 is a section on the line $xx$ of Fig. 3, showing the induced member of one of the motors and the magnetic switch, the fine winding being omitted for clearness.
Figure 3:
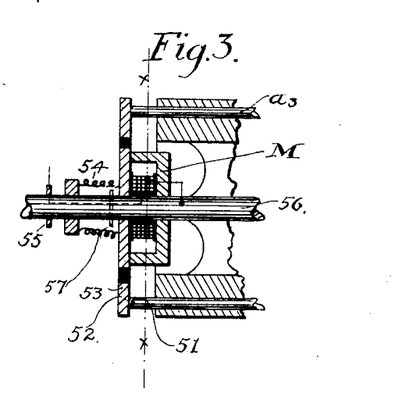
Fig. 3 is a section on the line $yy$ of Fig. 2.

Figs. 2 and 3 show the induced members, which may be the stators, if preferred, though I have shown them as rotors. In the form shown the bars $a^3$ are connected together at one end, as in the well-known Dolivo-Dobrowolsky winding, and at the other ends have notches 51, into which notches fits a conducting-ring 52, carried by a disk 53, sliding on but preferably insulated from the shaft of the motor and held back from the conductors by the springs 54. A magnet M serves to pull the disk, which in its inner portion should be of soft iron, against the conductors in order to close the winding. A ring 55 serves to introduce current to actuate the magnet, while the return-circuit is shown as being through the shaft of the motor. This magnet M is one of the magnets $M'$ $M^2$ $M^3$ in Fig. 1 and serves to open and close the heavy induced windings, as may be desired. A stop 57 controls the motion of the disk and prevents it from being drawn out of the range of the magnets.

Figure 4:
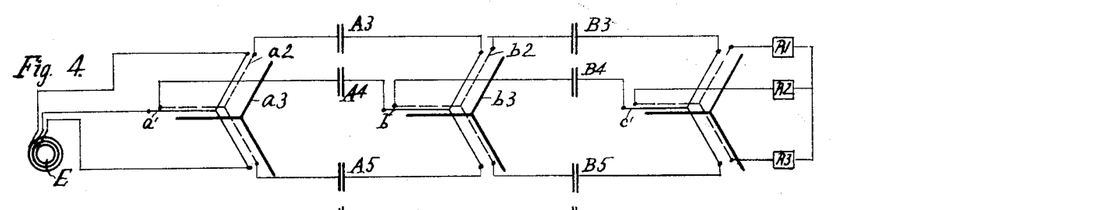
Figs. 4 to 9, inclusive, are diagrams showing the connections of the system illustrated in Fig. 1 at various positions of the controller.
Figure 5:
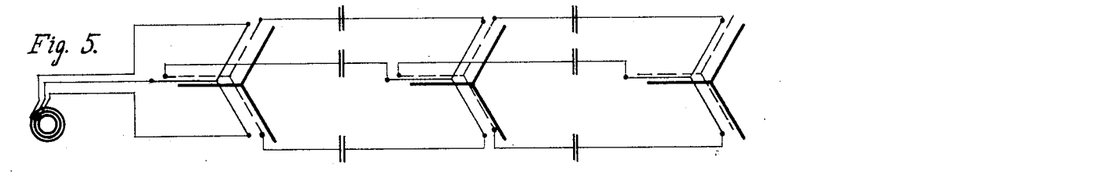

In the first position of the controller brushes 1, 2, and 3 rest on contacts $1^a$, $2^a$, and $3^a$, which are connected to contacts $4^a$, $5^a$, and $6^a$, as shown, whence the current travels by wires 58 59 60 to the primary winding $a'$ of the motor A. Supposing the motors to be at rest, an alternating current is induced in the winding $a^2$, which travels by the wires $a^4$ $a^5$ $a^6$ to the condensers $A^3$ $A^4$ $A^5$, wires $a^7$ $a^8$ $a^9$ to the brushes 7, 10, and 13, contacts $7^a$, $10^a$, and $13^a$, cross connections, contacts $16^a$ $17^a$ $18^a$, brushes 16 17 18, and wires $a^{10}$ $a^{11}$ $a^{12}$ to the primary winding $b^2$ of the motor B. In the same way the current induced in the winding $b^2$ on the induced member $B^2$ of the motor B flows by wires $b^4$ $b^5$ $b^6$ to the condensers $B^3$ $B^4$ $B^5$, wires $b^7$ $b^8$ $b^9$, brushes 19 22 25, contacts $19^a$ $22^a$ $25^a$, cross connections, contacts $28^a$ $29^a$ $30^a$, wires $b^{10}$, $b^{11}$, and $b^{12}$ to the primary winding $c'$ of the motor C. The current thus induced in the secondary winding $c^2$ of the motor C travels by wires $c^4$ $c^5$ $c^6$ to resistances $R'$ $R^2$ $R^3$, wires $c^7$ $c^8$ $c^9$, brushes 31 32 33 to the contact $31^a$, the common point of the three-phase system. It is now evident that each of the motors is producing a starting torque and that the system will accelerate to a speed approaching one-third of its normal speed; but as the resistances are interposed in the secondary of the last motor the slip will be large and the torque also large at low speeds, and the motors will run slowly with fair efficiency and great starting torque, which torque is increased by the action of the condensers. Each rotor slips considerably and has induced in it a current of a frequency which is a function of the slip, as is usual in tandem systems. The condensers are preferably adjusted to make the whole system resonant or consonant at a low speed. The capacity required is found by calculation in the well-known way. Fig. 4 shows the arrangement in diagram and needs no explanation. The motors being thus started, the controller is moved to the position $4^2$, when the brushes 8, 11, and 14, 20, 23, and 26 bear on the contacts $7^a$, $10^a$, $13^a$, $19^a$, $22^a$, and $25^a$, respectively, and the brushes 34 35 36 bear on the contact $31^a$.

This evidently cuts in a larger capacity in each circuit and cuts out some of the resistance, and the system is adjusted for a higher speed. In the same way at the position $4^3$ the whole capacity is in circuit and the winding $c^3$ is short-circuited. At this notch the motors will come to very nearly one-third of their normal speed and will run with great efficiency, and the position is therefore suitable for climbing heavy grades when the motors are placed on street-cars.

At the position 5' (shown in diagram in Fig. 5) the secondary of the motor C is opened by the brushes 31 to 39 coming off the contact $31^a$. Otherwise the connections are the same. The condition of resonance being thus destroyed and the secondary of the last motor being open, a small current only will flow in the "intermediate circuits," by which term I include all those circuits which lead from the secondary of one motor to the primary of the next. This is not a running position.

Figure 6:
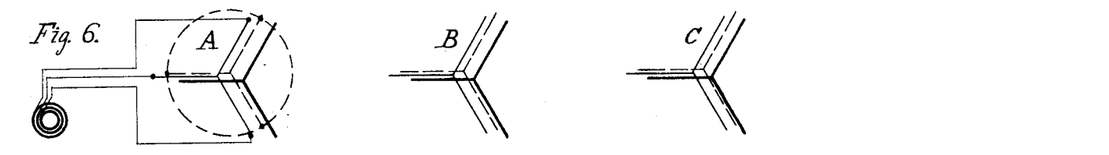

At the position 6' the motors B and C are cut out, and the brushes 40 41 42, attached to the wires $a^{13}$ $a^{14}$ $a^{15}$, bear on the contact $40^a$. The motor A is thus connected to line with its fine winding short-circuited. It will therefore slip considerably, owing to the resistance of the fine winding, but it will nevertheless speed up, as its normal or theoretical speed is now that due to the line frequency.

Figure 7:
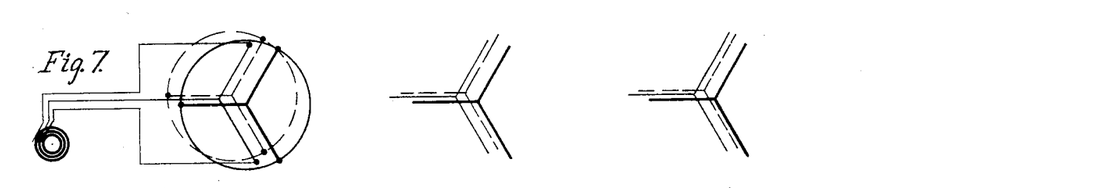
Figure 8:
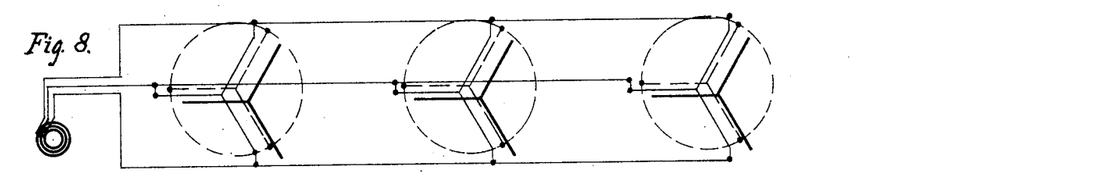

In the position 7' the brushes 46 47 bear on the segment $46^a$, and a current flows from the source s through the magnets $M'$ $M^2$ $M^3$, which attracts the disks 53 and closes all of the heavy windings; but as only one of the motors is supplied with current the others do not act. The connections are as indicated in Fig. 7. These two last positions are to be used as running positions only when high speed at low torque is wanted, as on a street-car running on a level or down a slight grade.

The positions 8' and 9' give the multiple connections. At 8' (represented in diagram in Fig. 8) the current enters, as before, at the brushes 1 2 3, but the segments $1^b$ $2^b$ $3^b$ are cross-connected to the segments $4^b$ $5^b$ $6^b$ $16^b$ $17^b$ $18^b$ and $28^b$ $29^b$ $30^b$, as shown, connecting all of the motors in multiple. The high-resistance secondaries are all closed by the brushes 37 to 45 bearing on the contact $37^a$. The motors thus tend to run at the speed due to the line frequency, but as their secondaries have high resistance they slip considerably and have a heavy torque, and the speed is considerably less than the theoretical.

Figure 9:
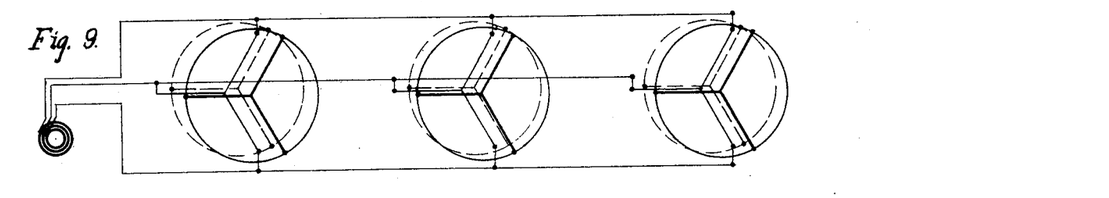

In the position 9' the brushes 46 and 47 bear on the segment $46^b$ and the low-resistance secondaries are again closed, which gives the final running position.

It will be seen that I thus provide an efficient system of motor control, in which the machines will start and run with a large torque, and that I avoid the objections mentioned above. While for some purposes I prefer to use the system just described, in other cases I prefer to employ that shown in Fig. 10, in which no condensers are used, but one of the motors, preferably the last of the series, is provided with a synchronous winding. In this form the motors are shown as capable of being short-circuited separately, which is in some cases an advantage, and other changes are made.

Figure 10:
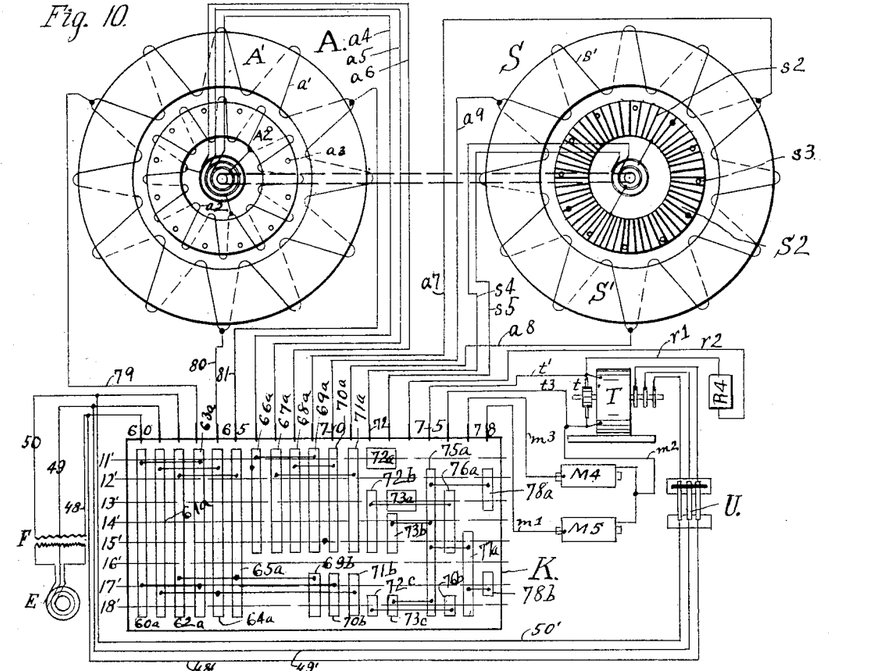
Fig. 10 shows two motors, one of which is provided with a synchronous winding and a controller.

In Fig. 10, E is the generator, and F the transformer, connected by the wires 48 49 50 with the brushes 60 61 62 of the controller K. A is the first motor, connected in any suitable way so that it must run at the same speed as the motor S and so that a transfer of energy may take place from one to the other. These conditions are fulfilled if both motors drive the same load, or if they are connected to different driving-wheels on the same railroad car or train, or if they are on the same shaft, and may be attained in various other ways. The motor A consists, as before, of the inductor $A'$, with inducing winding $a'$, and the induced member $A^2$, with two windings $a^2$ and $a^3$. The motor S consists of the inducing member $S'$, with the winding $s'$, and the induced member $S^2$, with the windings $s^2$ and $s^3$. Either or both members of each motor may rotate. The windings $a'$, $a^2$, $a^3$, $s'$, and $s^3$ are similar to the corresponding windings in Fig. 1, but the winding $s^2$ is adapted for direct current and may be similar to the field-magnet of a direct-current machine. In the particular form shown I have illustrated this winding $s^2$ as a continuous Gramme winding of the ordinary type. Such a winding is normally closed on itself, but in order that it may act as the induced member of an induction-motor it must be short-circuited by additional connections, which will be hereinafter described. It is supplied with direct current from any suitable source, but I have shown it fed by a small rotary transformer T, taking current from the wires 48 49 50 by the wires 48', 49', and 50' and the switch U. The rotary transformer indicated is of the ordinary type, with its field excited in shunt to its secondary, and a particular description is unnecessary.

$R^4$ is a resistance, and $M^4$ and $M^5$ the magnets which control the windings $a^3$ and $s^3$, respectively.

The winding $s^2$ is of sufficiently high resistance to serve as a starting-winding when short-circuited.

Figure 11:
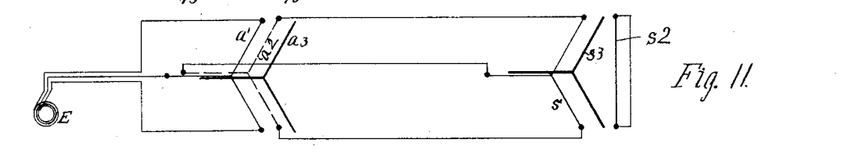
Figs. 11 to 18, inclusive, show in diagram the connections of the system illustrated in Fig. 10 at various positions of the controller.

When the controller is at the position 11', (shown in diagram in Fig. 11,) current enters at the brushes 60 61 62 and passes to the segments $60^a$ $61^a$ $62^a$ of the controller K, thence by the cross connections to the segments $63^a$ $64^a$ $65^a$, and by the wires 79 80 81 to the primary winding $a'$ of the motor A. The current induced in the secondary winding $a^2$ flows by the rings and brushes, wires $a^4$ $a^5$ $a^6$, brushes 66 67 68, segments $66^a$ $67^a$ $68^a$, cross connections, segments $69^a$ $71^a$ $70^a$, brushes 69 71 70, wires $a^7$ $a^8$ $a^9$ to the primary winding $s'$ of the motor S. The secondary winding $s^2$ is closed on itself by a circuit leading through the rings and brushes, wires $s^4$ and $s^5$, brushes 72 73 to the segment $72^a$. The motors will now start in tandem under load; but as the secondary $s^2$ is so wound and connected as to carry single-phase currents only, and as it is also of high resistance, the system will run at low speed and high torque. It is now well known that a single-phase secondary in a muliphase field tends to run at one-half the theoretical speed and slips from that speed much as a multiphase secondary slips in proportion to its resistance and according to the torque which it is obliged to exert. The use of a single-phase secondary in a multiphase field is not, however, broadly speaking, part of my invention, as it was invented by J. H. F. Goeregs and disclosed by him in various publications. I believe that I am the first to utilize this principle in a tandem system.

Figure 12:
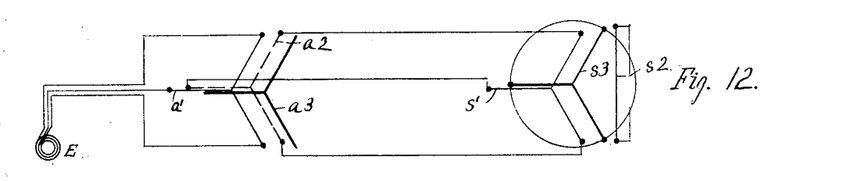

In the position 12' (shown in diagram in Fig. 12) the circuit of $s^2$ is opened, but the brushes 75 78 now bear on the segments $75^a$ and $78^a$, respectively, and current flows from the commutator $t$ of the transformer T by wire $t'$, brush 75, segment $75^a$, cross-connection, segment $78^a$, brush 78, wire $m'$, magnet $M^5$, and wire $m^2$ back to the commutator $t$. The windings $a^3$ and $s^3$ are controlled by the magnets, as are the windings $a^3$, $b^3$, and $c^3$ in Fig. 1, so that in this position the magnet $M^5$ closes the winding $s^3$, reducing the slip of the system. The motors will now run at a speed a little below half the theoretical—that is to say, a little less than half as fast as synchronous motors connected to line would run.

Figure 13:
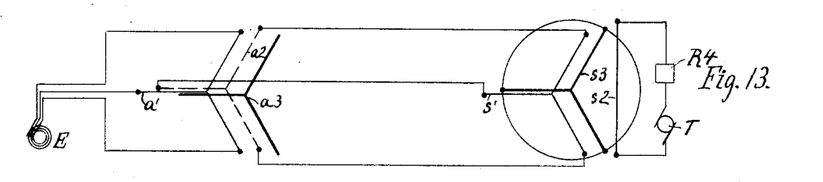

In the position 13' the brushes 75 and 78 bear on their respective segments as before, but in addition the brushes 72, 73, 74, and 76 bear on their respective segments. Current flows from the commutator $t$, wire $r'$, resistance $R^4$, wire $r^2$, brush 74, segment $73^a$, brush 73, wire $s^5$ to the winding $s^2$, thence by the wire $s^4$ to the brush 72, segment $72^b$, cross-connection, segment $76^a$, brush 76, and wire $t^3$ back to the commutator, exciting the direct-current winding $s^2$ of the motor S to such an extent that it will get up a wave of current which, when impressed on the circuits, will neutralize the self-induction of the system at a speed slightly below half of the theoretical speed. This position is one of low speed and great torque and is suitable for climbing hills and also for descending them. In the latter condition the system will return energy to the line in the following manner: The machine S will act as a generator and produce a current of, say, twenty alternations. This will produce a rotary field in the machine A in the member $A^2$, which member will in turn act as the field-magnet of a second generator and also as a transformer of frequency. The angular velocity of the resultant field in $A'$ will be due to that of the magnetic and mechanical rotations, and an alternating current of, say, forty alternations will be impressed upon the line. As the machine S is synchronous, and as the frequency of the line-current is fixed by the generator and cannot be changed by the action of the motors, which are of course of small power compared to that of the main generator, the whole system is maintained in rigid synchronism, though at a low speed. It will therefore be safe to use this notch of the controller, as well as positions 14' and 18', in descending heavy grades, and the use of a brake becomes unnecessary, except for sudden stops. The fact that A still acts as in induction-machines gives the whole system a flexibility which may be compared to that due to the use of a belt and prevents a sudden strain from breaking the machines or destroying the synchronism; but if the synchronism is lost it may be readily regained by placing the controller at the proper notch for a few seconds.

Figure 14:
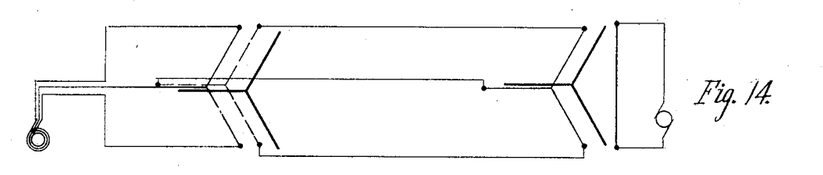

In position 14' the resistance $R^4$ is cut out. Otherwise the position is similar to 13'. The brushes 73 and 74 come off the segment $73^a$ and the brush 73 rests on the segment $73^b$, which is cross-connected to $75^a$. The brush 75, connected to the commutator $t$, still bears on the segment $75^a$, so that the winding $s^2$ is connected direct to the commutator and is thus more highly excited.

Figure 15:
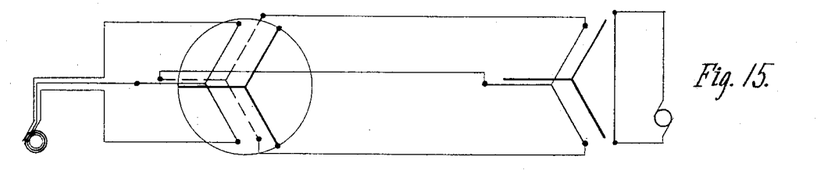
Figure 16:
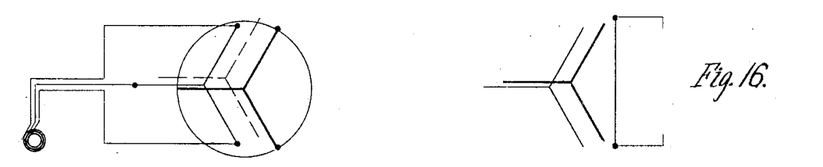

In the position 15' the connections are the same, except for the fact that the brush 77 rests on the segment $77^a$. Current then flows from the upper brush of the commutator $t$ through the wire $t'$ to brush 75, segment $75^a$, brush 77, wire $m^3$, magnet $M^4$, wire $m^2$ to the lower brush of the commutator $t$, exciting the magnet $M^4$ and closing the heavy winding $a^3$ of the motor A, as shown in Fig. 15. The heavy winding $a^3$ keeps the current in the winding $a^2$ down to a very small value, as it beats back the lines of force induced by the field-magnet $A'$, and it is now safe to open the intermediate circuits $a^4$, $a^5$, and $a^6$. This is accordingly done in the next position 16'. (Indicated in diagram in Fig. 16.) At the same time the connection to the direct-current winding $s^2$ is opened and the motor A runs alone with its heavy secondary short-circuited.

Figure 17:
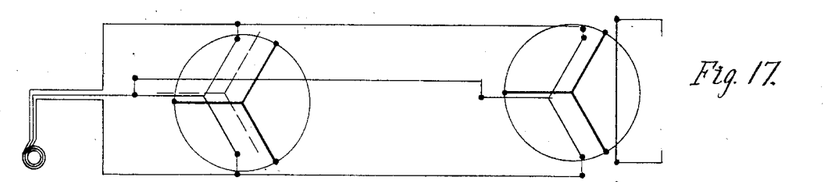

The position 17' (illustrated in diagram in Fig. 17) is the first multiple position. The segments $60^a$ $61^a$ $62^a$ are connected to $70^a$ $71^a$ $69^a$, as well as to $63^a$ $64^a$ $65^a$, and the secondaries $a^3$ and $s^3$ are closed by the brushes 75, 77, and 78, bearing on the segments $75^a$, $77^a$, and $78^b$, supplying direct current to the magnets $M^4$ and $M^5$.

Figure 18:
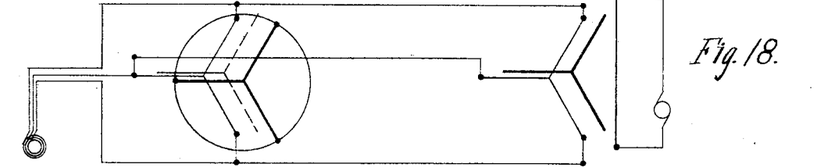

In the final position 18' (shown in diagram in Fig. 18) the secondaries $s^3$ are opened and the winding $s^2$ is closed on the commutator $t$, as in Fig. 15. This is a synchronous position in which the system runs as if the motor S only were in circuit; but if the synchronism breaks, owing to a heavy torque either against or with the motor, A will act either as a motor or as an induction-generator, as may be required, and restore synchronism. In this position the motors will return energy with good effect and allow the car to run down grades at its maximum speed with safety.

I have not illustrated or described the reversing arrangements, as they are already familiar to those skilled in the art. Nor have I illustrated the mechanical construction, as any suitable motors, generators, transformers, controllers, &c., may be used in my improved system.

Figure 19:
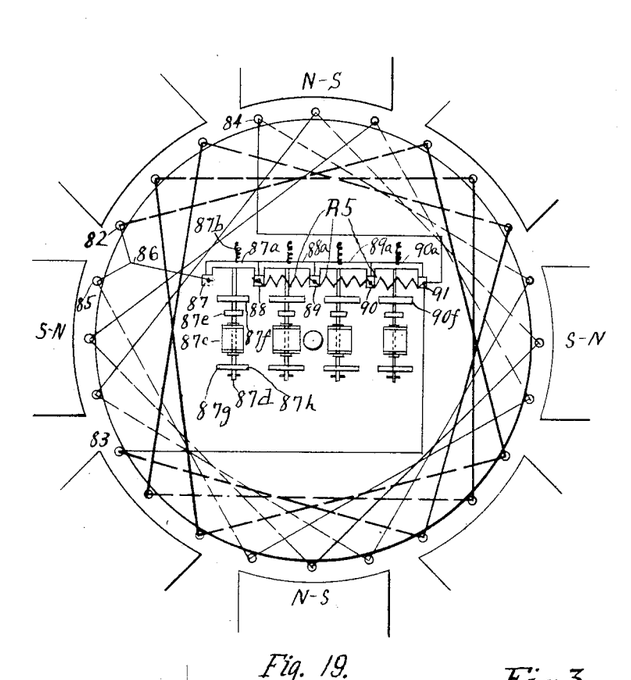
Fig. 19 shows an induced member wound with an interconnected two-phase winding with resistances inserted according to my improved method. In this figure, as in Figs. 2 and 3, the fine winding is not shown.

Fig. 19 shows more in detail the preferred form of induced member, with the fine winding omitted for clearness. The field is shown as one having eight polar projections, which with two-phase current will produce what is properly spoken of as a "four-pole field"—that is to say, a field having two resultant polar lines at right angles to each other. The induced winding is shown as interconnected two phase, and may be used in a field excited by current having any number of phases. The heavy lines show one circuit, the light lines the other. Dotted lines show connections at the lower end of the armature. The bars 82 and 83 are the terminals of one circuit and the bars 84 and 85 of the other. 82 and 85 are connected to the common return 86, in which is interposed the variable resistance $R^5$. Insulated blocks 87, 88, 89, 90, and 91 are mounted on the induced member, the common return 86 being connected to the block 87. The block 91 is connected to the bars 83 and 84. Switches $87^a$, &c., are controlled by springs $87^b$ and magnets $87^c$. The shafts $87^d$ carry the armatures $87^e$ of the magnets and move the switches. $87^f$ and $87^g$ are guides, and $87^h$ stops. The magnets are connected to the controller in a manner similar to that shown in Figs. 1 and 10. When the magnets are all unexcited, the switches are drawn back by the springs and the circuit is open. If current be admitted to the magnet $87^c$, the switch $87^a$ is drawn in and the circuit is closed through the resistances. Each successive switch as its particular magnet is excited cuts out more of the resistance. It will be seen that the windings on this armature form an interconnected two-phase system and that the effect of exciting the switch-magnets is to vary the resistance of the common return and thus vary the current flowing in both sides of the system. This last method of controlling the secondaries of motors and two-phase systems generally I regard as broadly new. It requires fewer resistances and less complication than any known method and is applicable to a variety of uses.

I have illustrated this improved method of regulating two-phase systems with a variable resistance in the common return; but it is obvious that any arrangement which will vary the impedance of the common return will be sufficient, as the impedance is a function not only of the resistance, but also of the self-induction and the frequency, and, in general, wherever I have spoken of "varying resistance" it is or may be sufficient to vary the impedance in any preferred way, and it is also well known that a change in self-induction, keeping the capacity fixed, is the equivalent of a change in capacity, keeping the self-induction fixed, the changes being made in accordance with the well-known formula for resonance-circuits, and I consider such a change to be within the scope of my invention.

I do not claim specifically in this application that feature of my invention which comprises the use of condensers in connection with tandem systems, as that use forms the subject of my divisional application, Serial No. 644,942, filed July 17, 1897.

I have illustrated my invention with especial reference to three-phase systems, which I consider preferable for ordinary work; but it is evident that my improvements are applicable to any alternating system whatever.

Therefore, without restricting myself to the various constructions and connections shown and described, though I have described and shown those which I believe to be best adapted to carrying out my invention in practical work, I claim as my invention and desire to secure by Letters Patent—

1. The method of converting the electrical energy of alternating current into mechanical motion which consists in setting up thereby in the primary member of a motor a field of force, inducing thereby in a secondary member a secondary current of lower frequency than the original current, neutralizing by a phase-advancing device part or all of the lag of the secondary current, and transmitting said current to a motor whose rotor is mechanically connected to the rotor of the first motor, substantially as described.

2. The method of increasing the torque of a tandem-motor system which consists in neutralizing by a phase-advancing device part or all of the lag of the intermediate circuit or circuits, substantially as described.

3. The method of increasing the torque of a tandem-motor system which consists in setting up, in one of the motors, a leading electromotive force, by acting upon the primary member of said motor by an overexcited field-magnet, substantially as described.

4. The method of reducing the spark on opening the secondary circuit of a translating device which consists in closing a tertiary circuit of low resistance in inductive relation to the secondary, and subsequently opening the secondary, substantially as described.

5. The method of regulating mechanism driven by a plurality of induction-motors which consists in coupling the motors in tandem, then connecting them in multiple, and finally reducing the resistance of the induced members by closing an additional winding on said members, substantially as described.

6. The method of regulating mechanism driven by a plurality of induction-motors which consists in connecting the motors in tandem, neutralizing the self-induction of the intermediate circuit or circuits, and connecting the motors in multiple, substantially as described.

7. The method of regulating mechanism driven by a plurality of induction-motors which consists in connecting the motors in tandem, adjusting the intermediate circuits to a condition of resonance at a series of different speeds, and finally connecting the motors in multiple, substantially as described.

8. The method of regulating mechanism driven by a plurality of induction-motors which consists in connecting the motors in tandem, reducing the resistance of the secondary of the last motor, open-circuiting said secondary, connecting the motors in multiple, and finally reducing the resistance of all of the motors by closing an additional winding on the secondary members, substantially as described.

9. The method of regulating mechanism driven by a plurality of induction-motors which consists in connecting the motors in tandem, adjusting the field strength of one of the motors to neutralize the self-induction, and then connecting the motors in multiple, substantially as described.

10. The method of regulating mechanism driven by a plurality of induction-motors which consists in connecting the motors in tandem, with a primary winding on one motor fed from a secondary winding on the other motor, closing an additional winding on one of the motors, and then connecting the motors in multiple, substantially as described.

11. The method of regulating mechanism driven by a plurality of induction-motors which consists in connecting the motors in tandem, adjusting the intermediate circuit or circuits to a condition at which the self-induction is neutralized, closing a heavy winding on the secondary of the first motor, and then connecting the motors in multiple, substantially as described.

12. The method of regulating mechanism driven by a plurality of induction-motors which consists in connecting the motors in tandem, adapting them by adjustment of the resistance and reactance to run at a series of different speeds, connecting the motors in multiple, and varying the resistance of the induced member, substantially as described.

13. The method of regulating mechanism driven by a plurality of induction-motors which consists in connecting the motors in tandem, adapting them by adjustment of the reactance and resistance to run at a series of different speeds, short-circuiting a heavy winding on the induced member of the first motor, and connecting the motors in multiple, substantially as described.

14. The method of regulating mechanism driven by a plurality of induction-motors which consists in connecting the motors in tandem, adjusting them to run at a series of different speeds, connecting the motors in multiple, and finally exciting a direct current-winding on one of the motors, substantially as described.

15. The method of regulating mechanism driven by a plurality of induction-motors which consists in connecting the motors in tandem, adjusting them to run at a series of different speeds, closing a heavy winding on the first motor, connecting the motors in multiple, and finally exciting by direct current a winding on one of the motors, substantially as described.

16. The method of returning energy to the line from a series of motors which consists in driving the motors by the movement of the load, generating in one of the motors by the action of a direct-current field-magnet an alternating current, exciting thereby the field-magnet of the second motor, generating thereby an alternating current, and feeding into the line the energy due to said second alternating current, substantially as described.

17. The combination with an alternating-current motor of an inducing member, and an induced member having an induced winding, a switch for opening and closing said induced winding, and a magnet for operating said switch, the switch and magnet being connected to and part of the induced member, substantially as described.

18. The combination of an alternating motor, a second motor connected so as to rotate therewith, a coil on the induced member of the first motor connected to a primary winding on the second motor, and an overexcited direct-current field-magnet on the second motor, substantially as described.

19. The combination of an alternating motor having two windings on its secondary member, a second motor connected so as to rotate therewith, a connection from one winding on the induced member of the first motor to a primary winding on the second motor, a direct-current winding on the second motor, a source of current therefor, and an adjustable resistance in circuit with said source and said direct-current winding, substantially as described.

20. The combination of an alternating motor having two windings on its secondary, with a second alternating motor connected in tandem with one of the windings on the secondary of the first motor, substantially as described.

21. In a tandem system, a plurality of electric motors one or more of which are furnished with two secondary windings, one of said windings being of high resistance and acting as the generating winding for the next motor, and one of low resistance, with means for opening and closing the low-resistance winding, substantially as described.

22. In an alternating-current motor, a secondary member furnished with a magnetic short-circuiting device attached thereto and revolving therewith, and means for supplying current suitable for actuating the magnet, substantially as described.

23. A secondary for an induction-motor wound with an interconnected two-phase winding, in combination with means for varying the impedance of the common return, substantially as described.

24. A secondary for an induction-motor wound with an interconnected two-phase winding with a resistance in the common return, in combination with a magnetically-actuated switch so constructed and arranged as to cut said resistance into or out of circuit at will, substantially as described.

25. The combination with a plurality of alternating motors of a switch so constructed and arranged as to connect the motors first in tandem, then in multiple with their secondaries short-circuited, and finally to short-circuit an additional winding on the induced members of the motors, substantially as described.

26. In a tandem multiple system, the combination of a plurality of motors, means for advancing the phase of the current in the intermediate circuits, and a switch for regulating the action of said means according to the speed required, substantially as described.

27. The combination of a plurality of alternating motors with a switch so constructed and arranged as to first connect the motors in tandem, then in multiple, and to reduce the resistance of the induced windings in the multiple position below what it was when the motors were connected in tandem, substantially as described.

28. In a tandem multiple system, two motors, one of which is provided with a member adapted to act as a generating member and also adapted to act as a short-circuited secondary, in combination with means for reducing the resistance of said member while acting as a short-circuited secondary below what it was while the member was acting as a generating member, substantially as described.

29. In a tandem system, a plurality of multiphase motors connected in tandem, the last of the series being provided with a single-phase secondary winding, substantially as described.

30. A combined motor and phase-regulator consisting of an inducing member adapted to be excited by alternating currents, in combination with an induced member wound with a short-circuited winding and with an overexcited direct-current winding, substantially as described.

31. In a combined motor and phase-regulator the combination of an inducing member adapted to be excited by alternating currents, with an induced member wound with a short-circuited winding and with an overexcited direct-current winding, with means for varying the excitation of the direct-current winding, substantially as described.

In testimony whereof I have hereto set my hand this 9th day of November, in the year 1896.

ALBERT GOULD DAVIS.

Witnesses:
S. G. HOPKINS,
R. D. WHITE.